Dec. 11, 1934.    C. W. VAN RANST.    1,984,291
MOTOR VEHICLE
Filed March 21, 1932    2 Sheets-Sheet 1
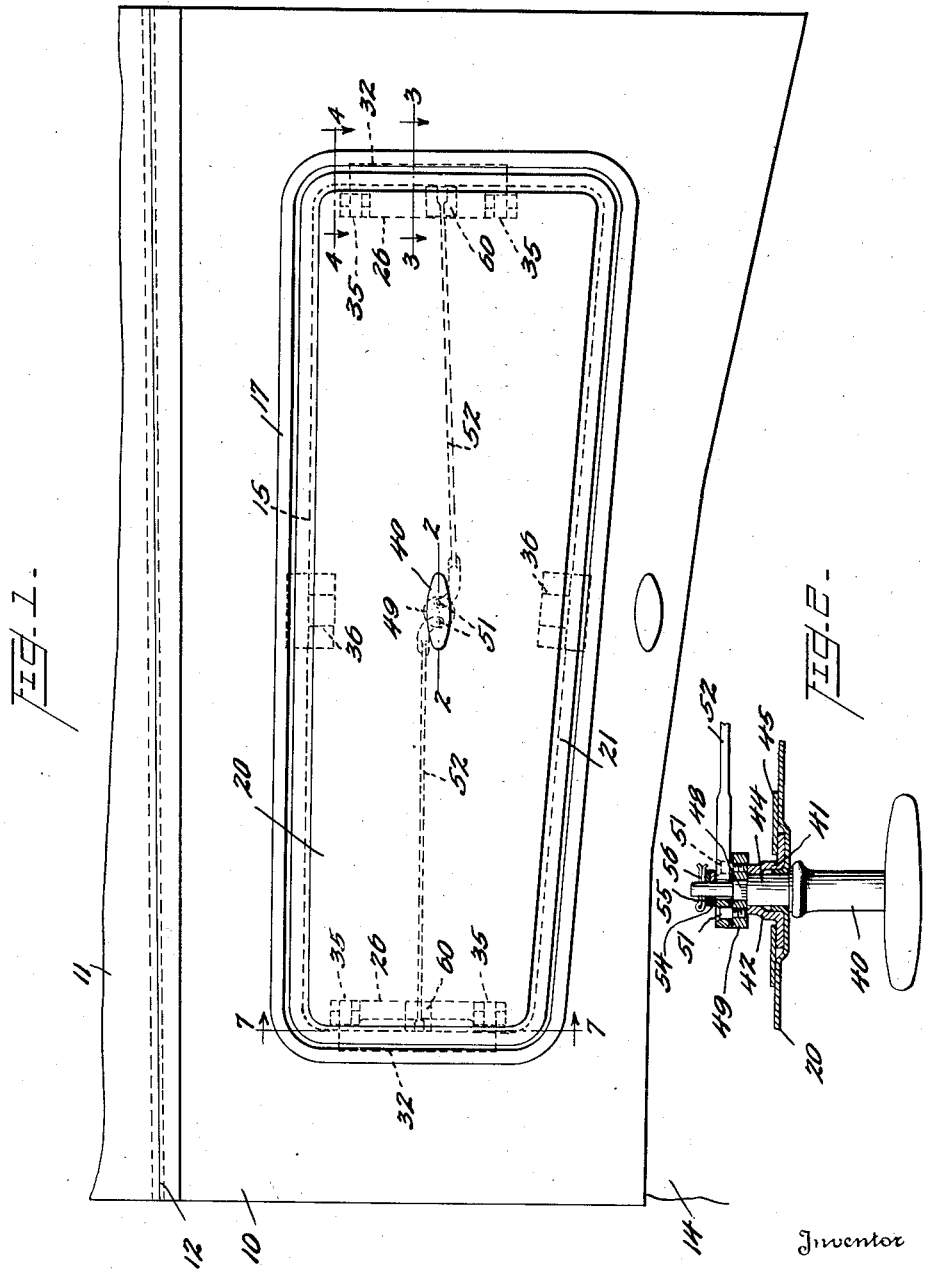

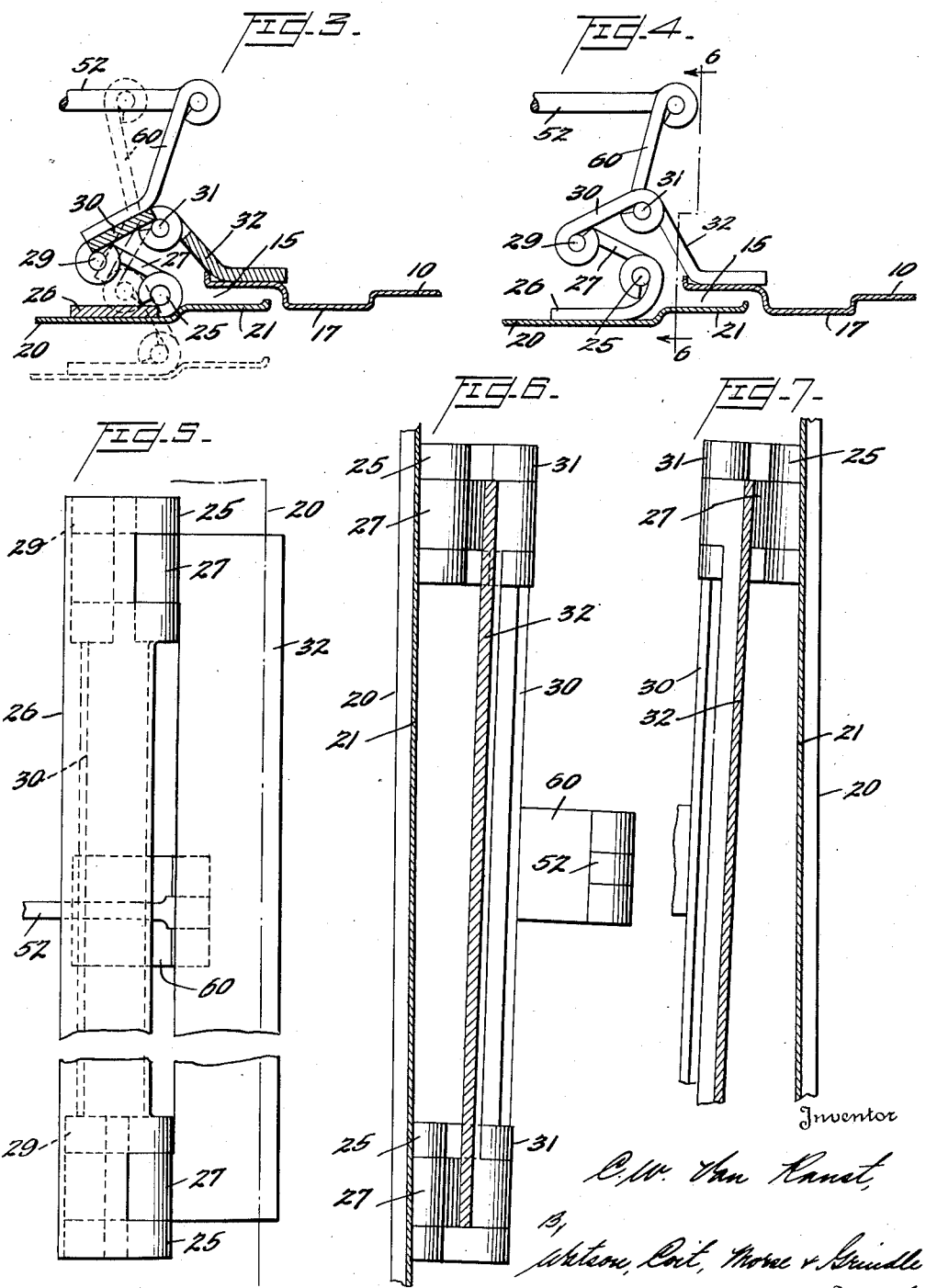

Patented Dec. 11, 1934

1,984,291

UNITED STATES PATENT OFFICE 1,984,291

MOTOR VEHICLE

Cornelius W. Van Ranst, Detroit, Mich.

Application March 21, 1932, Serial No. 600,344

13 Claims. (Cl. 180—69)

This invention relates to ventilators for motor vehicle hoods and has for its object the provision of a ventilator which may be readily manipulated to regulate the degree of ventilation, which provides for the maximum flow of air when fully opened, and which has a pleasing and unobtrusive appearance either in the opened or closed position.

A more specific object of the invention is to provide in lieu of the usual louvers or series of doors on the side of the hood, a single door or closure member for a single opening, the opening having a very large area as compared with the area of the side of the hood.

A further object of the invention is the provision of a closure member for a ventilating opening in a motor vehicle hood which is supported for bodily movement substantially perpendicularly to the side of the hood so that movement of the closure member to opened or partly opened position permits air to circulate freely between the closure member and the hood about the entire perimeter of the closure member.

Further objects and features of the invention will be apparent from the following description taken in connection with the accompanying drawings, in which:

Figure 1 is an elevational view of a motor hood illustrating one form of the present invention;

Figure 2 is a partial sectional view on the line 2—2 of Figure 1;

Figures 3 and 4 are sectional views on the lines 3—3 and 4—4 respectively of Figure 1;

Figure 5 is an elevation of a portion of the construction shown in Figure 1 and corresponding to Figures 3 and 4 with the closure member and hood removed;

Figure 6 is a sectional view on the line 6—6 of Figure 4; and

Figure 7 is a sectional view on the line 7—7 of Figure 1.

In describing the invention reference is made to the accompanying drawings in which a preferred embodiment thereof is shown. In order to facilitate an understanding of this embodiment specific descriptive language is used but it will be appreciated that no limitation of the scope of the invention is intended thereby and that various changes and alterations may be made without departing from the principles underlying the invention.

In Figure 1 is shown a conventional motor hood comprising a substantially vertical side portion 10 and a curved upper portion 11, these portions being hinged as indicated at 12 to permit raising the side portion 10 so that the motor may be readily inspected. A portion of the vehicle frame is shown at 14.

The ventilating opening 15 is unusually large, extending over a considerable area of the side of the hood, the latter being provided with a distended portion or bead 17 of considerable width as shown in Figures 3 and 4 surrounding the opening 15. The closure member 20 has an outline conforming generally to the outline of the opening 15 and is of larger area, the peripheral portion 21 of the closure member being offset inwardly. Figures 3 and 4 of the drawing show the closure member in withdrawn or closed position, the offset portion 21 thereof lying substantially flush with the bead 17 on the hood. If desired, a suitable packing of soft material such as felt may be provided between the facing portions of the hood and closure member to completely seal the opening.

In order to mount the closure member for bodily movement in a direction outwardly of the opening 15, supporting means are provided at the sides of the closure member and preferably at all four sides thereof. This supporting means may consist of double hinges each constituting the equivalent of a pair of single hinges, one secured to the hood and one secured to the closure member, the free portions of the hinges being pivotally connected. Thus, as shown in Figure 3 of the drawings, the supporting means for the rear edge of the closure member comprises a hinge 25 having one arm 26 thereof secured in any convenient manner to the closure member, for instance by welding, and having the other arm 27 thereof hingedly connected as at 29 to the arm 30 of a second hinge 31, the remaining arm 32 of the hinge 31 engaging and being secured to the hood adjacent the opening 15.

It will be observed from Figures 1 and 5 to 7 inclusive of the drawings that the arms 26, 30, and 32 are relatively long and extend substantially parallel to the closure member, a double hinge of similar construction being provided at the forward side of the closure member as shown in Figure 1 of the drawings, the pivotal connections between these longer arms being effected adjacent the upper and lower portions thereof as indicated generally at 35 in Figure 1 of the drawings.

It is also preferable to provide a similar double hinged connection 36 between the hood and the closure member at the upper and lower sides of the latter, these hinges being constructed in a manner similar to that employed in the forward and rearward hinges hereinbefore described with the exception that the hinge may be relatively short.

From this construction it is apparent that the closure member is supported for bodily movement from closed to opened position outwardly of the opening 15 and remains at all times substantially parallel to the side of the hood, thus affording an adequate clearance entirely around the opening whereby air entering through the radiator at the forward end of the vehicle may be readily discharged.

The closure member is preferably manipulated to any desired position and retained therein by means of an operating handle 40 journalled in a bushing 41 which rotates about an axis substantially perpendicular to the hood, the hood being offset inwardly as indicated at 42 in Figure 2 of the drawings to receive the spindle 44 of the operating handle, bushing 41 being retained in position by means of an annular plate 45, the parts being welded together if desired. At its inner end the spindle is provided with a reduced portion 48 to which is keyed or otherwise secured a crank disc or crank arm 49. The disc 49 is threaded to receive a pair of pivot pins 51 disposed on opposite sides of the spindle 44, each of which passes through an eye in one end of a link 52, thus affording an articulated connection between each link 52 and the disc 49. A bushing 54 surrounds the outer end of the spindle and is provided with an annular flanged portion overlying the ends of the links 52 to ensure retention of the latter in position on the pins 51, the bushing being in turn retained on the spindle by means of a washer 55 and cotter pin 56.

The opposite end of each of the links 52 is connected to the double hinge at the corresponding end of the closure member, this connection being preferably effected as shown in Figures 3 and 4 in which an arm 60 is welded or otherwise secured to the arm 30 of the hinge and is provided at its free end with a hinged connection to the link 52.

It will be observed that when the handle 40 is rotated, the resulting rotation of the crank disc 49 will serve to simultaneously draw each of the links 52 toward each other and will thus move the associated free end of the arm 60 toward the central portion of the hood. This movement of the arm 60 toward the dotted line position in Figure 3 serves to move the arms 27 and 30, which form in effect a toggle, toward a straightened position and the extension of this toggle shifts the closure member bodily outwardly of the opening in the hood. It will be noted that by reason of the connection between the links 52 and the crank disc, the closure member is positively locked in either the closed or the entirely opened position since any force acting on the closure member and transmitted through the links 52 will be directed through the axis of the spindle 44.

Having thus described the invention, what is claimed as new and desired to be secured by Letters Patent is:

1. In a motor vehicle, the combination with an engine hood having a ventilating opening therein, of a closure member for said opening, means for supporting said closure member for bodily movement toward and away from said opening, said means comprising a toggle connection between said hood and said closure member at opposite sides of the latter, and operating means for simultaneously moving said toggle connections toward and away from a straightened position.

2. In a motor vehicle, the combination with an engine hood having a ventilating opening therein, of a closure member for said opening, means for supporting said closure member for bodily movement toward and away from said opening, said means comprising a toggle connection between said hood and said closure member at opposite sides of the latter, and operating means for simultaneously moving said toggle connections toward and away from a straightened position, said means comprising links having articulated connection with one member of each of said toggle connections.

3. In a motor vehicle, the combination with an engine hood having a ventilating opening therein, of a closure member for said opening, means for supporting said closure member for bodily movement toward and away from said opening, said means comprising a toggle connection between said hood and said closure member at opposite sides of the latter, operating means for simultaneously moving said toggle connections toward and away from a straightened position, said means comprising links having articulated connection with one member of each of said toggle connections, an operating spindle extending through the side of said closure member and journalled therein for rotation about an axis substantially perpendicular thereto, and an arm carried by said spindle and connected with said links.

4. In a motor vehicle, the combination with an engine hood having a substantially rectangular ventilating opening in the side thereof, of a closure member for said opening, and means for supporting said closure member for bodily movement toward and away from said opening, said means including double hinge connections at each side of said opening between said closure member and hood, each hinge connection comprising a pair of members having pivotal connection with each other and with the closure member and hood respectively.

5. In a motor vehicle, the combination with an engine hood having a substantially rectangular ventilating opening in the side thereof, of a closure member for said opening, and means for supporting said closure member for bodily movement toward and away from said opening, said means including double hinge connections at each side of said opening between said closure member and hood, the axes of each of said hinge connections being substantially parallel to the adjacent side of the opening.

6. In a motor vehicle, the combination with a hood having an opening in the side thereof, of a closure member for said opening, double hinge connections between said hood and closure member at opposite sides of the latter, said hinge connections being reversely disposed, and a common operating means for simultaneously flexing said hinge connections.

7. In a motor vehicle, the combination with an engine hood having a ventilating opening in the side thereof, of a closure member for said opening, and means for supporting said closure member for bodily movement toward and away from said opening, said means including a double hinge connection between said hood and said closure member, said double hinge connection comprising a pair of members having pivotal connection with each other and with the closure member and hood respectively.

8. In a motor vehicle, the combination with an engine hood having a ventilating opening in the side thereof, of a closure member for said opening, and means for supporting said closure member for bodily movement toward and away from said opening, said means including a plurality of double hinged connections between said hood and said closure member located at opposite sides of the latter, each hinge connection comprising a pair of members having pivotal connection with each other and with the closure member and hood respectively.

9. In a motor vehicle, the combination with an engine hood having a ventilating opening in the side thereof, of a closure member for said opening, means for supporting said closure member for bodily movement toward and away from said opening, said means including a plurality of double hinged connections between said hood and said closure member located at opposite sides of the latter, and means operatively connecting said hinged connections to constrain the latter to movement in unison.

10. In a motor vehicle, the combination with an engine hood having a ventilating opening in the side thereof, of a closure member for said opening, means for supporting said closure member for bodily movement toward and away from said opening, said means including a plurality of double hinged connections between said hood and said closure member located at opposite sides of the latter, and operating means associated with said hinged connections for manipulating the latter to position said closure member.

11. In a motor vehicle, the combination with an engine hood having a ventilating opening in the side thereof, of a closure member for said opening, means for supporting said closure member for bodily movement toward and away from said opening, said means including a plurality of double hinged connections between said hood and said closure member located at opposite sides of the latter, operating means associated with said hinged connections for manipulating the latter to position said closure member, said operating means comprising a rotatable element, and link members having articulated connection with said hinged connections and said rotatable element.

12. In a motor vehicle, the combination with an engine hood having a single ventilating opening in the side of the hood extending over the major portion thereof, of a single closure member supported on said hood for movement toward and away from said opening, and means including a double hinge connection between said hood and closure member for supporting the latter, said double hinge connection comprising a pair of members having pivotal connection with each other and with the closure member and hood respectively.

13. In a motor vehicle, the combination with an engine hood having a ventilating opening in the side thereof, of a closure member for said opening, and means for supporting said closure member for bodily movement toward and away from said opening, said means being located within the enclosure formed by the hood and closure member, and operating means for said supporting means connected to the latter and extending through said closure member.

CORNELIUS W. VAN RANST.